United States Patent [19]
Odagawa

[11] Patent Number: 5,276,451
[45] Date of Patent: Jan. 4, 1994

[54] NAVIGATION SYSTEM WITH NAVIGATIONAL DATA PROCESSING

[75] Inventor: Satoshi Odagawa, Kawagoe, Japan

[73] Assignee: Pioneer Electronic Corporation, Tokyo, Japan

[21] Appl. No.: 911,109

[22] Filed: Jul. 9, 1992

[30] Foreign Application Priority Data

Jul. 9, 1991 [JP] Japan ................................. 3-168015
Jul. 9, 1991 [JP] Japan ................................. 3-168016
Jul. 9, 1991 [JP] Japan ................................. 3-168017

[51] Int. Cl.[5] .......................... G01S 5/02; G01S 3/02
[52] U.S. Cl. ................................. 342/357; 342/451; 342/457
[58] Field of Search ....................... 342/357, 451, 457

[56] References Cited

U.S. PATENT DOCUMENTS

| | | | |
|---|---|---|---|
| 4,899,285 | 2/1990 | Nakayama et al. | 342/357 |
| 4,903,212 | 2/1990 | Yokouchi et al. | 342/357 |
| 4,912,645 | 3/1990 | Kakihara et al. | 342/357 |
| 4,928,107 | 5/1990 | Kuroda et al. | 342/357 |
| 5,087,919 | 2/1992 | Odagawa et al. | 342/357 |

*Primary Examiner*—Gregory C. Issing
*Attorney, Agent, or Firm*—Kane, Dalsimer, Sullivan, Kurucz, Levy, Eisele and Richard

[57] ABSTRACT

A navigation system for use on an automobile, for example, has a GPS positioning device for determining a present position thereof from radio waves transmitted from GPS satellites, and a stand alone type positioning device including an direction sensor and a speed sensor, for determining a present position thereof from direction data from the direction sensor and speed data from the speed sensor. A data processor selects data from the GPS positioning device or data from the stand alone type positioning device. The data processor selects the data from the GPS positioning device, and/or corrects a distance corrective coefficient for the speed sensor if a PODP value is equal to or smaller than a predetermined value, if speed data from the GPS positioning device is equal to or greater than a predetermined value, and if the difference between the speed data from the GPS positioning device and the speed data from the stand alone type positioning device is equal to or smaller than a predetermined value, and additionally if the data from the GPS positioning device has been obtained consecutively three times at time intervals each equal to or smaller than a predetermined value, and if the consecutive three data from the GPS positioning device are equal to or smaller than a predetermined value.

6 Claims, 5 Drawing Sheets

NAVIGATION SYSTEM WITH NAVIGATIONAL DATA PROCESSING

BACKGROUND OF THE INVENTION

1. Field of the Invention

The present invention relates to a navigation system for use with a mobile object, and more particularly to a navigation system including a data processor for producing data to estimate the position of a reception point highly accurately.

2. Description of the Prior Art

There are known stand alone type positioning devices for navigating various mobile objects such as automobiles, airplanes, ships, or the like in a global geometrical region. A stand alone type navigation system on a mobile object has an direction sensor and a speed sensor. The stand alone type navigation system determines a two-dimensional displacement (vector quantity) of the mobile object based on direction data from the direction sensor and speed data from speed sensor, and finds the present position of the mobile object by adding the determined two-dimensional displacement to the positional data of a reference position. For example, the stand alone type positioning system on an automobile produces a predetermined number of pulses per revolution of the drive shaft of the automobile, and calculates the distance that the automobile has traveled by multiplying a distance calculated from the total number of pulses produced while the automobile has moved from the reference position to the present position, by a distance corrective coefficient. Since, however, the two-dimensional displacement contains accumulated errors of the direction and speed sensors, the stand alone type positioning system requires some means for eliminating the accumulated errors. More specifically, because of the accumulated errors of the sensors, if a distance corrective coefficient that has once been established for the speed sensor remained unchanged, then the calculated distance would include an error. Distances calculated for automobiles by stand alone type positioning systems are also subjected to errors depending on the number of passengers on board and the conditions of roads on which the automobiles run. Consequently, when an automobile with a stand alone type positioning system makes a turn at an intersection, it has heretofore been necessary for the user of the navigation system to manually correct the distance corrective coefficient if the user finds the navigation system either overrunning or underrunning.

Such accumulated errors cause no problem with global positioning systems (GPS) for determining the position of a mobile object in a global geometrical region based on radio waves transmitted from three or more GPS satellites. The global positioning system determines the position of a reception point where its radio-wave receiver has received the radio waves, based on quasi-distance data between the GPS satellites and the reception point, including a time offset of the receiver, and positional data of the GPS satellites The global positioning systems produce direction data by measuring the rate of change of the quasi-distance data based on Doppler shifts observed in the radio waves from the GPS satellites. Consequently, when the reception point moves slowly, the direction data produced by the global positioning system is of low accuracy. Furthermore, when the reception point is at rest, the speed data obtained by the global positioning systems becomes larger than the actual speed due to the multipath effect of the radio waves, and the global positioning systems generate wrong direction data.

SUMMARY OF THE INVENTION

It is an object of the present invention to provide a navigation system which can produce data to estimate the present position of a reception point with high accuracy even when the reception point is moving slowly or at rest.

Another object of the present invention is to provide a navigation system capable of automatically correcting a distance corrective coefficient for accurately determining the distance that a reception point has traveled.

According to the present invention, there is provided a navigation system including GPS positioning unit for determining a present position thereof from radio waves transmitted from GPS satellites, stand alone type positioning unit including an direction sensor and a speed sensor, for determining a present position thereof from direction data from the direction sensor and speed data from the speed sensor, and data processing unit for selecting one, at a time, of data from the GPS positioning unit and data from the stand alone type positioning unit, the data processing unit including unit for selecting the data from the GPS positioning unit if a PODP value is equal to or smaller than a predetermined value, if speed data from the GPS positioning unit is equal to or greater than a predetermined value, and if the difference between the speed data from the GPS positioning unit and the speed data from the stand alone type positioning unit is equal to or smaller than a predetermined value.

The data processing unit may comprise unit for selecting the data from the GPS positioning unit additionally if the data from the GPS positioning unit ha been obtained consecutively three times at time intervals each equal to or smaller than a predetermined value, and if the consecutive three data from the GPS positioning unit are equal to or smaller than a predetermined value.

According to the present invention, there is also provided a navigation system including GPS positioning unit for determining a present position thereof from radio waves transmitted from GPS satellites, the GPS positioning unit including unit for determining the distance between two geographical points, stand alone type positioning unit including a speed sensor, for determining a present position thereof from speed data from the speed sensor using a distance corrective coefficient, and data processing unit for correcting the distance corrective coefficient based on the determined distance from the GPS positioning unit if a PODP value is equal to or smaller than a predetermined value, if speed data from the GPS positioning unit is equal to or greater than a predetermined value, and if the difference between the speed data from the GPS positioning unit and the speed data from the stand alone type positioning unit is equal to or smaller than a predetermined value.

The data processing unit may comprise unit for correcting the distance corrective coefficient based on the determined distance from the GPS positioning unit additionally if the data from the GPS positioning unit has been obtained consecutively three times at time intervals each equal to or smaller than a predetermined value, and if the consecutive three data from the GPS positioning unit are equal to or smaller than a predetermined value.

According to the present invention, there is further provided a navigation system including GPS positioning unit for determining a present position thereof from radio waves transmitted from GPS satellites, the GPS positioning unit including unit for producing speed data, stand alone type positioning unit including a speed sensor, for determining a present position thereof from speed data from the speed sensor using a distance corrective coefficient, and data processing unit for correcting the distance corrective coefficient based o the speed data from the GPS positioning unit if a PODP value is equal to or smaller than a predetermined value, if speed data from the GPS positioning unit is equal to or greater than a predetermined value, and if the difference between the speed data from the GPS positioning unit and the speed data from the stand alone type positioning unit is equal to or smaller than a predetermined value.

The data processing unit may comprise unit for correcting the distance corrective coefficient based on the determined distance from the GPS positioning unit additionally if the data from the GPS positioning unit has been obtained consecutively three times a time intervals each equal to or smaller than a predetermined value, and if the consecutive three data from the GPS positioning unit ar equal to or smaller than a predetermined value.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
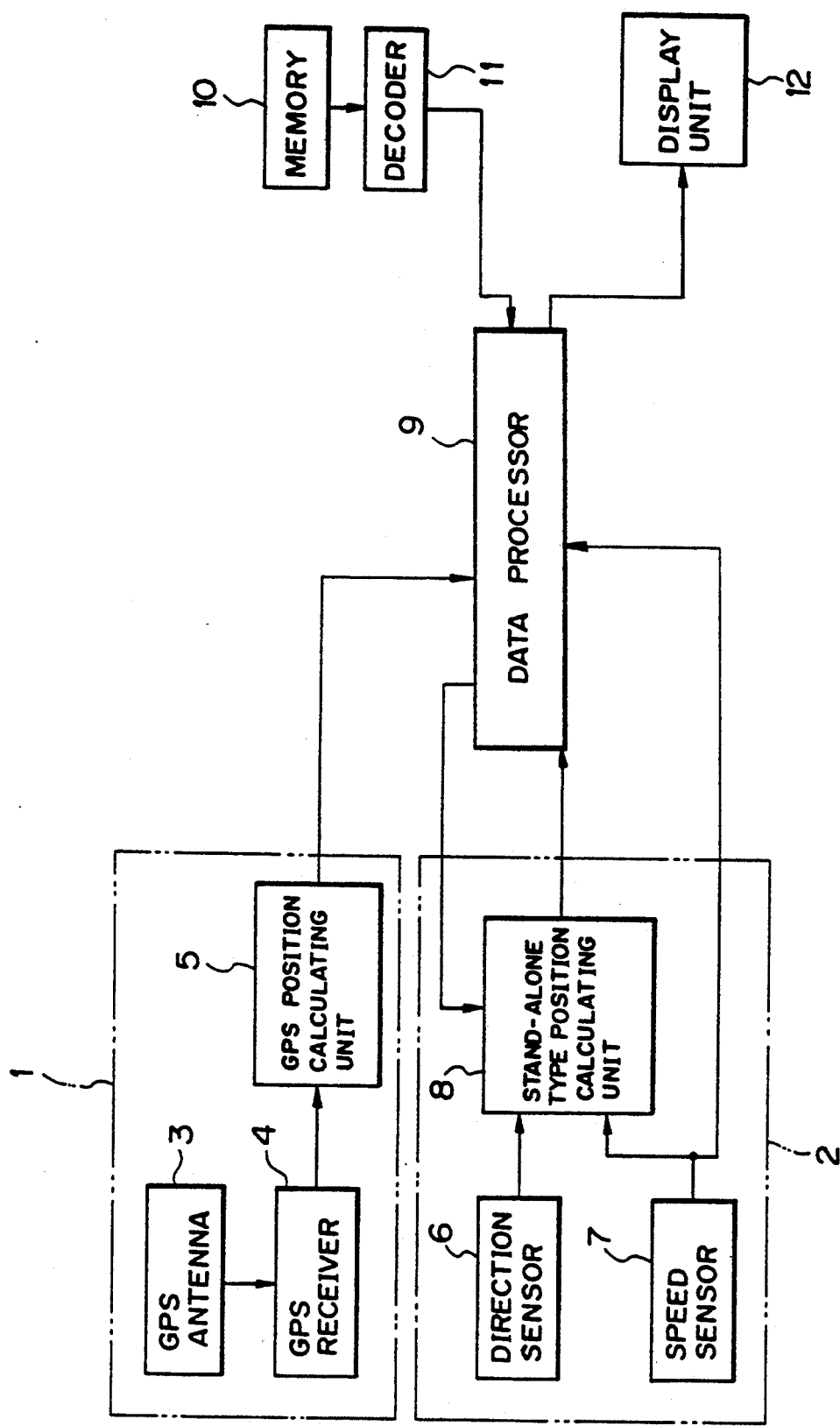
FIG. 1 is a block diagram of a navigation system according to the present invention.

FIG. 1 shows in block form a navigation system according to the present invention. The navigation system is typically mounted on an automobile, for example, for estimating the present position of the automobile and conducting the automobile to a desired destination.

As shown in FIG. 1, the navigation system generally comprises a GPS positioning device 1, a stand alone type positioning device 2, a data processor 9, a memory 10, a decoder 11, and a display unit 12.

The GPS positioning device 1 has a GPS antenna 3 for receiving radio waves from GPS satellites, a GPS receiver 4 connected to the output terminal of the GPS antenna 3, and a GPS position calculating unit 5 for determining the present position of a reception point, i.e., a mobile object such as an automobile, based on a signal from the GPS receiver 4.

The stand alone type positioning device 2 has an direction sensor 6 for detecting the direction of the reception point, a speed sensor 7 for detecting the speed of the reception point, and a stand alone type position calculating unit 8 for determining the present position of the reception point from the past running data or history of the reception point based on signals from the sensors 6 and 7.

The memory 10, which may be a compact disc, a ROM, or the like storing map information or the like, is connected through the decoder 11 to the data processor 9. The display unit 12, which may be a CRT or the like, is also connected to the data processor 9.

The GPS position calculating unit 5, stand alone type position calculating unit 8, and the data processor 9 are implemented by a microcomputer comprising a central processing unit, a RAM connected to the central processing unit for temporarily storing data, and a ROM connected to the central processing unit for storing various programs for the GPS position calculating unit 5, stand alone type position calculating unit 8, and the data processor 9. The GPS position calculating unit 5 calculates the present position of the reception point based on the signal from the GPS receiver 4, and outputs data indicating the calculated present position to the data processor 9. The stand alone type position calculating unit 8 calculates the present position of the reception point based on the signals from the direction sensor 6 and the speed sensor 7, and outputs data indicating the calculated present position to the data processor 9. The data processor 9 selects either the data from the GPS positioning device 1, i.e., the GPS position calculating unit 5, or the data from the stand alone type positioning device 2, i.e., the stand alone type position calculating unit 8, matches the selected data with the map information around the present position which has been read from the memory 10, and displays the present position of the reception point on the display unit 12.

The GPS position calculating unit 5, stand alone type position calculating unit 8, and the data processor 9 may be implemented by respective independent processing circuits.

Selection by the data processor 9 of either the data from the GPS positioning device 1 or the data from stand alone type positioning device 2 will be described below. The data processor processor 9 selects the data from the GPS positioning device 1 when the following three conditions are satisfied:

(1) A PDOP (Position Dilution of Precision) value is a predetermined value or greater.
(2) Speed data from the GPS positioning device 1 is of a predetermined value or higher.
(3) The difference between the speed data from the GPS positioning device 1 and the speed data from the speed sensor 7 is equal to or smaller than a predetermined value.

The PDOP value is representative of how positional errors of the GPS satellites are reflected by the calculated present position of the reception point. If the PDOP value is larger, then it indicates that the calculated present position of the reception point is including a greater error. It has empirically been found that the PDOP value, which is used as one condition for selecting the data from the GPS positioning device 1, should preferably be 4. In the case where the GPS satellites are located such that the PDOP value is 4, if measured distances up to the GPS satellites have an average error of 10 m, then the calculated present position of the reception point undergoes a standard error of 40 m, as described below. Therefore, the present position of the reception point can be determined highly accurately.

Standard error=PDOP value×Average error of distances up to GPS satellites=4×10 m=40 m.

The speed data from the GPS positioning device 1 should be of a predetermined value or higher to select the data from the GPS positioning device 1 for the following reasons: The GPS positioning device 1 determines the direction of the reception point by measuring the rate of change of quasi-distance data between the GPS satellites and the reception point due to Doppler shifts in the radio waves from the the GPS satellites. Therefore, when the speed of travel of the reception point is low, the accuracy of the direction data is also low. Such a problem can be solved by selecting the data from the GPS positioning device 1 only when the speed data from the GPS positioning device 1 is of a predetermined value or higher. It is found that a minimum speed for keeping the direction data highly accurate is preferably about 30 km/h.

When the difference between the speed data from the GPS positioning device 1 and the speed data from the speed sensor 7 is equal to or smaller than a predetermined value, any error of the direction data which is caused by the multipath effect of the radio waves can be eliminated. The predetermined value should preferably be about 3 km/h.

The data processor processor 9 may select the data from the GPS positioning device 1 when the following two conditions are satisfied in addition to the above three conditions (1), (2), and (3):

(4) The data from the GPS positioning device 1 is obtained consecutively three times at time intervals each equal to or longer than a predetermined time period.

(5) Three consecutive direction data from the GPS positioning device 1 are of a predetermined value or smaller.

The time period in the condition (4) should preferably be 2 seconds. When the data from the GPS positioning device 1 is obtained consecutively three times at time intervals each equal to or longer than 2 seconds, the data has stably been received from the GPS positioning device 1 for several seconds in the past up to the present.

The predetermined value in the condition (5) should preferably be±10°. When three consecutive direction data are equal to or less than±10°, the reception point is moving straight. Therefore, if the condition (5) is satisfied, highly accurate direction data can be obtained from the GPS positioning device 1.

The GPS positioning device 1 will be described in detail below with reference to FIG. 2.

Figure 2:
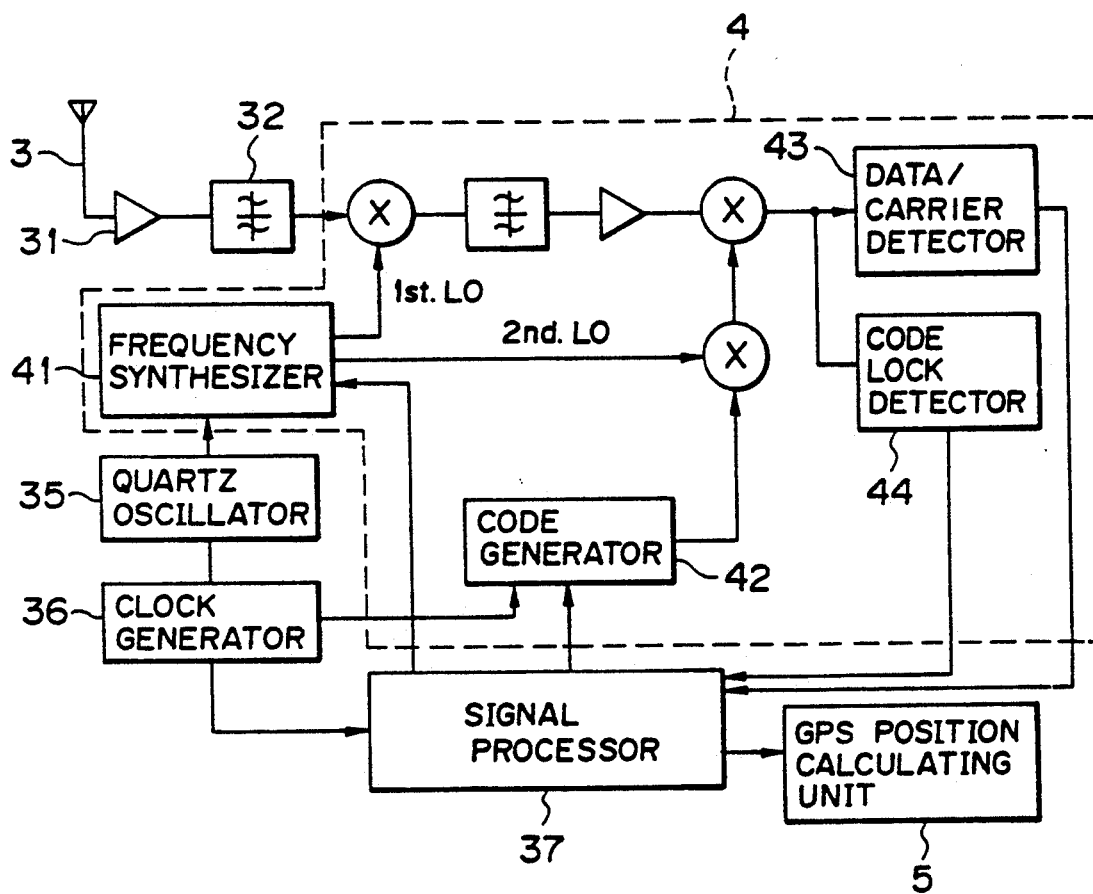
FIG. 2 is a detailed block diagram of a GPS positioning device in the navigation system shown in FIG. 1.

As shown in FIG. 2, the GPS antenna 3 is connected to the GPS receiver 4 through a preamplifier 31 and a bandpass filter 32. The GPS positioning device 1 also has a quartz oscillator 35 for producing a reference frequency signal as a timing control signal, and a clock generator 36 for generating a clock signal for controlling the timing of operation of a signal processor 37 which is connected to the GPS receiver 4. The GPS position calculating unit 5 is connected to the signal processor 37.

The GPS receiver 4 has a frequency synthesizer 41 responsive to the reference frequency signal from the quartz oscillator 35 and a signal from the signal processor 37 for generating a signal having the same pattern as the data relative to the signal carrier of the GPS satellites, the position of the GPS satellites, and the clocks in the GPS satellites. A code generator 42 generates a code signal having the same pattern as a distance signal in response to the clock signal from the clock generator 36 and the signal from the signal processor 37. Based on output signals from the frequency synthesizer 41 and the code generator 42, a data/carrier detector 43 detects, by way of correlation detection, data relative to the clocks in the GPS satellites and the orbits of the GPS satellites, and the signal carrier of the GPS satellites. A code lock detector 44 detects by way of correlation detection, the distance signal with the code signal from the code signal generator 42.

Figure 3:
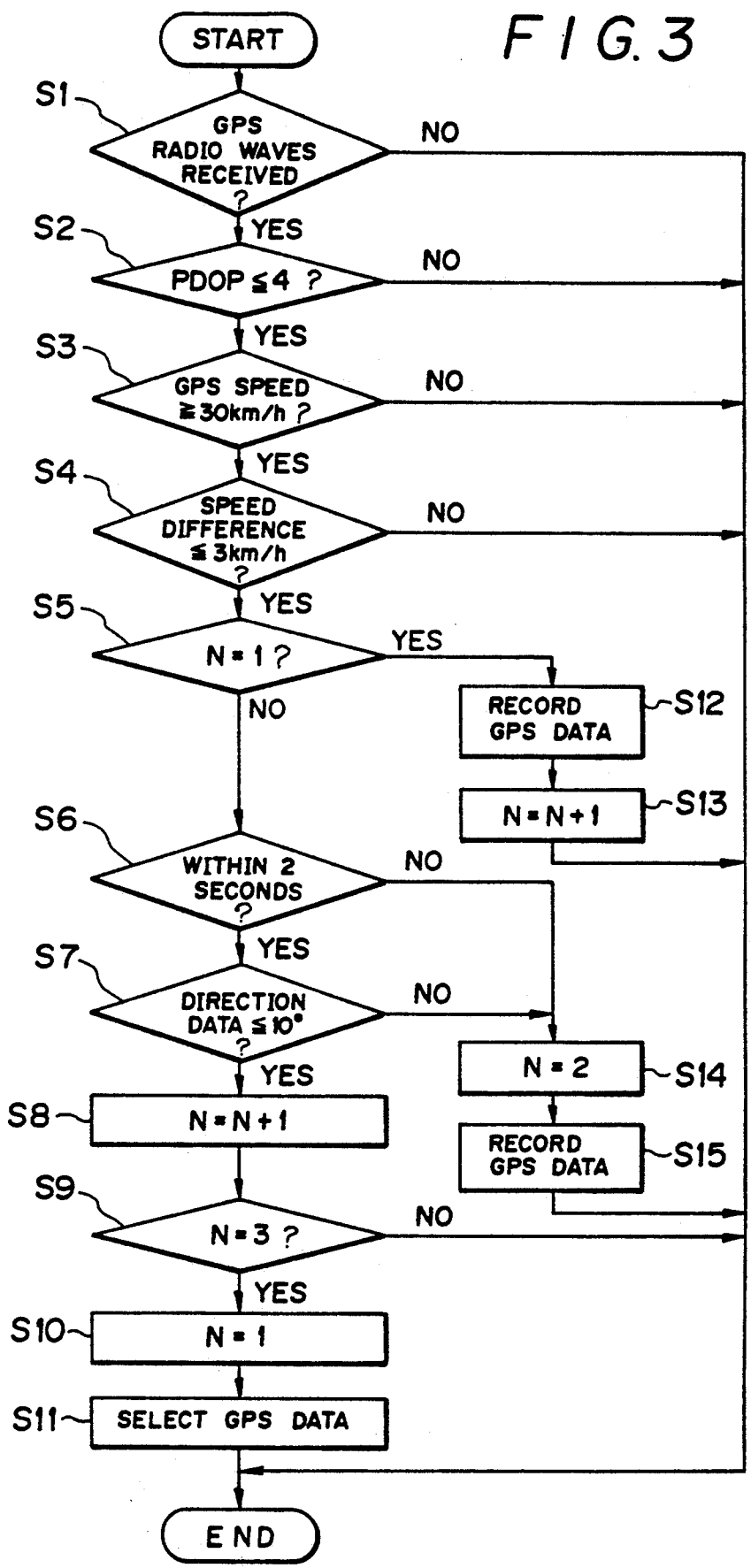
FIG. 3 is a flowchart of an operation sequence of the navigation system according to the present invention.

The direction sensor 6 of the stand alone type positioning device 2 is a geomagnetic sensor or gyrocompass for detecting the direction in which the reception point moves. The speed sensor 7 is a rotational speed sensor. The stand alone type positioning device 2 calculates the distance that the reception point has traveled by integrating the speed of the reception point as detected by the speed sensor 7. The calculated distance is accumulated in relation to changes in the direction of movement of the detection point as detected by the direction sensor 6, thus obtaining past running data or history of the reception point. Based on the past running data or history of the reception point, the path along which the reception point has moved from the reference position is calculated to determine the present position Operation of the navigational data processing system according to the first embodiment of the present invention will be described below with reference to FIG. 3. The operation sequence shown in FIG. 3 is referred to as a filtering process.

After the navigational data processing system starts to operate, the data processor 9 determines, in a step S1, whether the radio waves from the GPS satellites are being received by the GPS antenna 3. If the radio waves from the GPS satellites are being received by the GPS antenna 3, then the data processor 9 determines, in a step S2, whether or not the PDOP value is equal to or smaller than a predetermined value (=4). If the PDOP value is equal to or smaller than 4, then the data processor 9 determines, in a step S3, whether or not the speed data from the GPS positioning device 1 is equal to or greater than a predetermined value (=30 km/h). If the speed data from the GPS positioning device 1 is equal to or greater than 30 km/h, then the data processor 9 determines, in a step S4, whether or not the difference between the speed data from the GPS positioning device 1 and the speed data from the speed sensor 7 is equal to or less than a predetermined value (=3 km/h). If the speed data difference is equal to or less than 3 km/h, then the data processor 9 determines, in a step S5, whether or not the data from the GPS positioning device 1 has been obtained for the first time. If the data from the GPS positioning device 1 has not been obtained for the first time, then the data processor 9 determines, in a step S6, whether or not the data from the GPS positioning device 1 has been obtained within a predetermined time interval (=2 seconds). If the data from the GPS positioning device 1 has been obtained within 2 seconds, then the data processor 9 determines, in a step S7, whether or not the consecutive direction data from the GPS positioning device 1 are equal to or less than a predetermined value (=10°). If the consecutive direction data from the GPS positioning device 1 are equal to or less than=10°, then the data processor 9 increments a data reception counter by 1 in a step S8. Thereafter, the data processor determines, in a step S9, whether or not the data from the GPS positioning device 1 has been obtained consecutively three times. If the data from the GPS positioning device 1 has been obtained consecutively three times, then the data processor 9 resets the data reception counter back to 1 in a step S10. The data processor 9 selects the direction data from the GPS positioning device 1 in a step S11.

If no radio waves are received from the GPS satellites by the GPS antenna 3 in the step S1, then the data processor 9 does not select the direction data from the GPS positioning device 1. If the answer is NO in each of the steps S2, S3, S4, then the data processor 9 does not select the direction data from the GPS positioning device 1 either. If the data from the GPS positioning device 1 has been obtained for the first time in the step S5, then the data processor 9 records the direction data from the GPS positioning device 1 in a step S12, increments the data reception counter by 1 in a step S13, and does not select the direction data from the GPS positioning device 1. If the answer is NO in each of the steps S6, S7, then the data processor 9 sets the data reception counter to 2 in a step S10, records the direction data from the GPS positioning device 1 in a step S15, does not select the direction data from the GP positioning device 1. If the data from the GPS positioning device 1 has not been obtained consecutively three times, then the data processor 9 does not select the direction data from the GPS positioning device 1.

Consequently, only when the conditions (1) through (5) are satisfied, the data processor 9 does selects the direction data from the GPS positioning device 1. The filtering process shown in FIG. 3 is repeated to preclude GPS data containing a large error as when the reception point moves slowly or the received radio waves experience the multipath effect. Accordingly, the present position of the reception point can be estimated with high accuracy.

Before the direction data from the GP positioning device 1 is selected by the data processor 9 in the step S11, the direction sensor 6 of the stand alone type positioning device 2 may be corrected using the direction data from the GPS positioning device 1. Inasmuch as direction sensor 6 is corrected frequently, therefore, the positioning accuracy of the stand alone type positioning device 2 is increased.

While all the conditions (1) through (5) are checked in the operation sequence shown in FIG. 3, the direction data from the GPS positioning device 1 may be selected only when the conditions (1) through (3) are satisfied.

As described above, the direction data from the GPS positioning device 1 is selected if at least the conditions (1) through (3) are satisfied, and the direction data from the stand alone type positioning device 2 is selected if the conditions (1) through (3) are not satisfied. Consequently, the present position of the reception point can be estimated highly accurately even when the reception point is moving slowly or at rest. The addition of the conditions (4) and (5) to the above conditions (1) through (3) makes it possible to estimate the present position of the reception point much more accurately.

The data processor 9 also operates to correct a distance corrective efficient which is used in the stand alone type position calculating unit 8 to correct the speed data from the speed sensor 7 if at least the conditions (1) through (3), described above with reference to the first embodiment, are satisfied.

The distance corrective coefficient will be described in detail below. Usually, the speed sensor 7 of the stand alone type positioning device 2 is coupled to a speedometer cable which rotates with the drive shaft of the automobile. Therefore, when the drive shaft rotates, the speed sensor 7 generates a pulse signal indicative of the rotational speed of the drive shaft. It is now assumed that p=0 when the speed sensor 7 generates two pulses per revolution of the drive shaft, p=1 when the speed sensor 7 generates four pulses per revolution of the drive shaft, p=2 when the speed sensor 7 generates eight pulses per revolution of the drive shaft, the total number of pulses generated by the speed sensor 7 while the automobile is traveling between two geographical points A, B is indicated by n, and the distance corrective coefficient is indicated by k. The distance d between the two geographical points A, B is then expressed by the following equation:

$$d = k \cdot n \cdot \frac{1}{2^{p-q}} \quad (1)$$

where q=0.39 ... [m] which is a numerical value according to JIS for p=1. From the above equation (1), the distance corrective coefficient k is given as follows:

$$k = \frac{2^{p-q}}{1} \cdot \frac{d}{n} \quad (2)$$

Heretofore, the distance corrective coefficient k has been determined to be closest to 1 in relation to the value of p, and has not been corrected once determined. As a result, detection errors of the speed sensor 7 are accumulated, resulting in a large error in the calculated distance.

According to the present invention, if the data from the GPS positioning device 1 satisfy the conditions (1) through (3), the distance corrective coefficient k is corrected based on the distance d between the two points A, B. Specifically, when the navigation system is in an initial state, the data processor 9 determines the value of p such that the distance corrective coefficient k is closest to 1. Then, each time the distance between the two points A, B is obtained from the GPS positioning device 1, the distance data is substituted in the equation (2) to determine the distance corrective coefficient k, so that the series of distance corrective coefficients k thus determined will converge. More specifically, as indicated by the equation (3) below, a present distance corrective coefficient $k_n$ is calculated by adding, to a previous distance corrective coefficient $k_{n-1}$ determined according to the equation (2), a certain proportion of the difference between the initial distance corrective coefficient k and the previous distance corrective coefficient $k_{n-1}$.

$$k_n = k_{n-1} + h(k - k_{n-1}) \quad (3)$$

where h is a constant ranging from 0 to 1.

Since the distance corrective coefficient k is automatically corrected based on the distance data from the GPS positioning device 1 the calculated distance that the reception point has traveled is prevented from suffering from an error which would otherwise result from accumulated errors of the speed sensor 7. The distance corrective coefficient can also be corrected when the number of passengers on board varies or the road condition varies, without unduly imposing a burden on the user.

The distance corrective coefficient k may be corrected if all the conditions (1) through (5) are satisfied.

Figure 4:
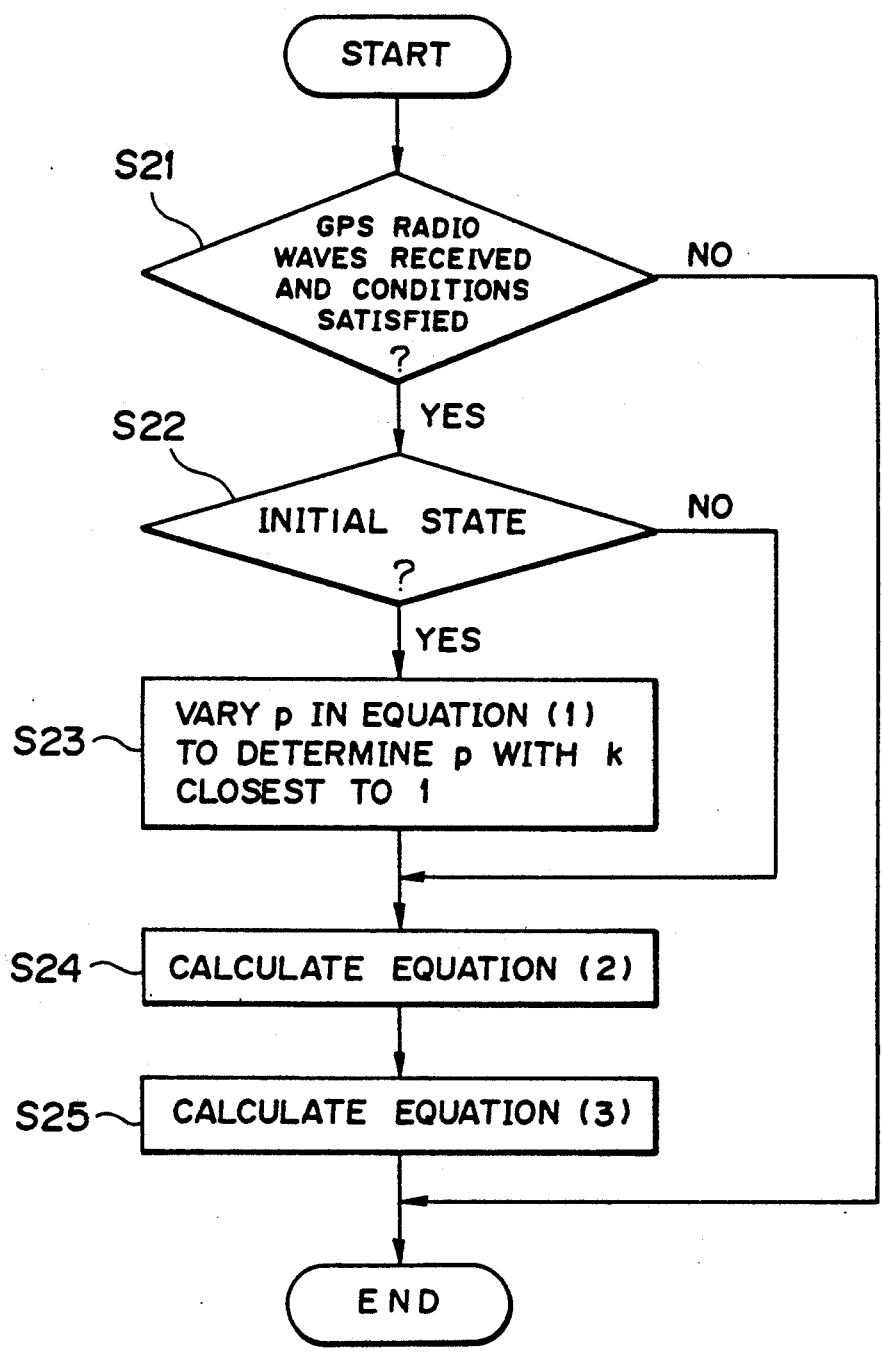
FIG. 4 is a flowchart of another operation sequence of the navigation system.

FIG. 4 shows an operation sequence for correcting the distance corrective coefficient k based on the distance.

After the navigational data processing system starts to operate, the data processor 9 determines, a step S21, whether the radio waves from the GPS satellites are being received by the GPS antenna 3, and also whether or not the data from the GPS positioning device 1 satisfy the conditions (1) through (3) or the conditions (1) through (5). If the data from the GPS positioning device 1 satisfy the conditions (1) through (3) or the conditions (1) through (5), then the data processor 9 determines whether or not the navigation system is an initial state in a step S22. If in the initial state, the data processor 9 varies the value of p from 0 to 1 to 2 in the equation (1) to determine the value of p such that the distance corrective coefficient k is closest to 1 in a step 23. If not in the initial state, the data processor 9 skips the step S23. After the step S23, the data processor 9 carries out a calculation according to the equation (2) in a step S24, and then carries out a calculation according to the equation (3) in a step S25, determining the corrected distance corrective coefficient k. If the data from the GPS positioning device 1 do not satisfy the conditions (1) through (3) or the conditions (1) through (5) in the step S21, then the data processor 9 does not automatically correct the distance corrective coefficient k.

The data processor 9 executes the operation sequence shown in FIG. 4 each time it receives data from the GPS positioning device 1, and automatically corrects the distance corrective coefficient k each time the data from the GPS positioning device 1 satisfy the conditions (1) through (3) or the conditions (1) through (5).

The data processor 9 may also operate to correct the distance corrective efficient k based on the speed data from the speed sensor 7. The distance corrective coefficient k as it is related to the speed data will be described below.

The speed v of the automobile upon elapse of a unit time t is expressed as follows:

$$v = \frac{k \cdot n \cdot 1/2^{p-1}}{t} \quad (4)$$

From the above equation (4), the distance corrective coefficient k is given as follows:

$$k = \frac{2^{p-q}}{1} \cdot \frac{v t}{n} \quad (5)$$

Figure 5:
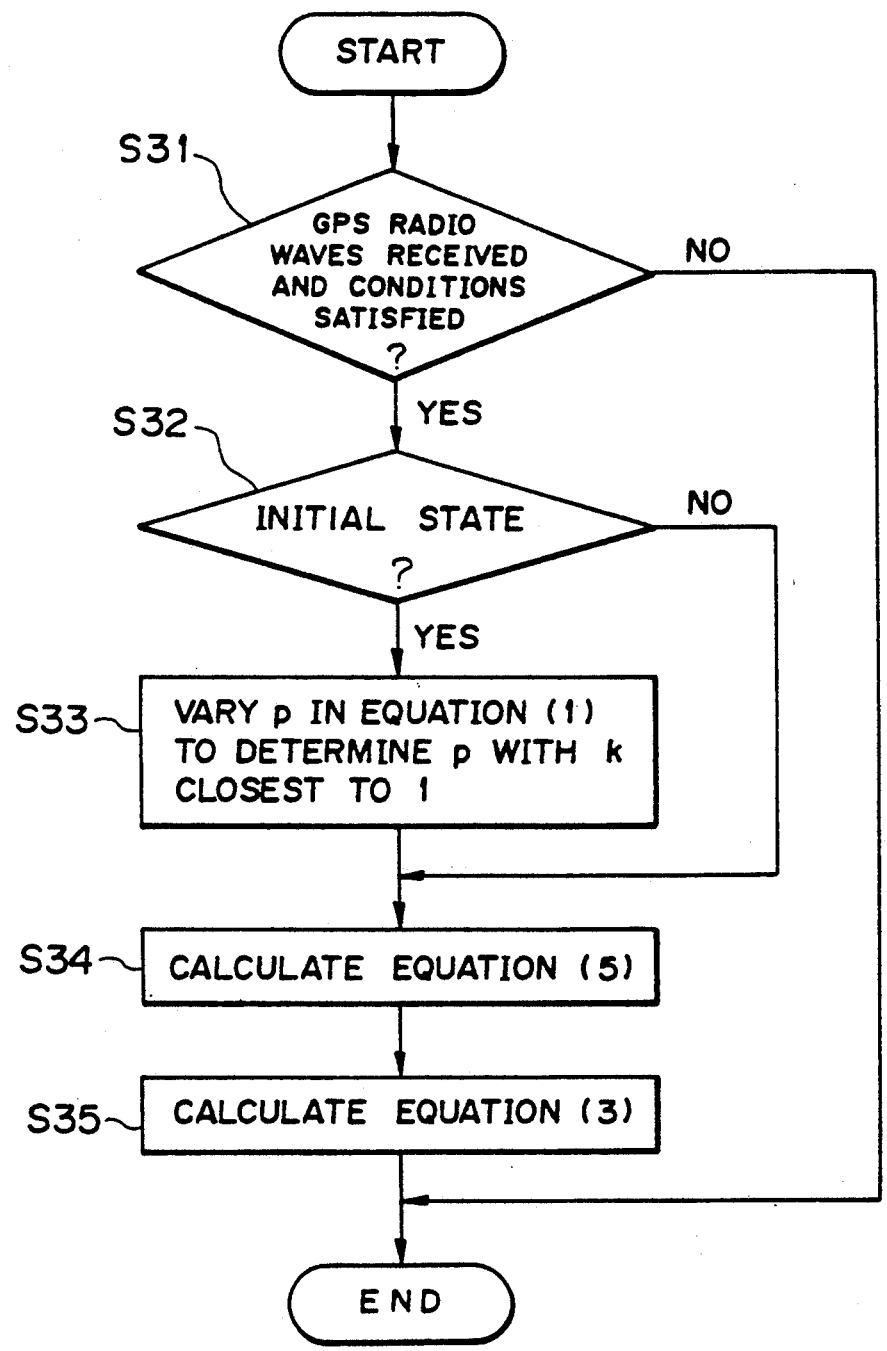
FIG. 5 is a flowchart of still another operation sequence of the navigation system.

FIG. 5 shows an operation sequence for correcting the distance corrective coefficient k based on the speed data.

After the navigational data processing system starts to operate, the data processor 9 determines, a step S31, whether the radio waves from the GPS satellites are being received by the GPS antenna 3, and also whether or not the data from the GPS positioning device 1 satisfy the conditions (1) through (3) or the conditions (1) through (5). If the data from the GPS positioning device 1 satisfy the conditions (1) through (3) or the conditions (1) through (5), then the data processor 9 determines whether or not the navigation system is an initial state in a step S32. If in the initial state, the data processor 9 varies the value of p from 0 to 1 to 2 in the equation (4) to determine the value of p such that the distance corrective coefficient k is closest to 1 in a step S33. If not in the initial state, the data processor 9 skips the step S33. After the step S33, the data processor 9 carries out a calculation according to the equation (5) in a step S34, and then carries out a calculation according to the equation (3) in a step S35, determining the corrected distance corrective coefficient k. If the data from the GPS positioning device 1 do not satisfy the conditions (1) through (3) or the conditions (1) through (5) in the step S31, then the data processor 9 does not automatically correct the distance corrective coefficient k.

The data processor 9 executes the operation sequence shown in FIG. 5 each time it receives data from the GPS positioning device 1, and automatically corrects the distance corrective coefficient k each time the data from the GPS positioning device 1 satisfy the conditions (1) through (3) or the conditions (1) through (5).

While the present invention has been described with respect to a navigation system, the principles of the present invention are also applicable to an engine control system, a speed display device, a distance display device, or the like.

Although certain preferred embodiments of the present invention have been shown and described in detail, it should be understood that various changes and modifications may be made therein without departing from the scope of the appended claims.

What is claimed is:

1. A navigation system comprising:
   GPS positioning means for determining a present position thereof from radio waves transmitted from GPS satellites;
   stand alone type positioning means including a direction sensor and a speed sensor, for determining a present position thereof from direction data from said direction sensor and speed data from said speed sensor; and
   data processing means for selecting one, at a time, of data from said GPS positioning means and data from said stand alone type positioning means, said data processing means comprising means for selecting the data from said GPS positioning means if a PDOP value is equal to or smaller than a predetermined value, if speed data from said GPS positioning means is equal to or greater than a predetermined value, and if the difference between said speed data from said GPS positioning means and the speed data from said stand alone type positioning means is equal to or smaller than a predetermined value.

2. A navigation system according to claim 1, wherein said data processing means comprises means for selecting the data from said GPS positioning means additionally if the data from said GPS positioning means has been obtained consecutively three times at time intervals each equal to or smaller than a predetermined value, and if the consecutive three data from said GPS positioning means are equal to or smaller than a predetermined value.

3. A navigation system comprising:
   GPS positioning means for determining a present position thereof from radio waves transmitted from GPS satellites, said GPS positioning means including means for determining the distance between two geographical points;

stand alone type positioning means including a speed sensor, for determining a present position thereof from speed data from said speed sensor using a distance corrective coefficient; and data processing means for correcting said distance corrective coefficient based on the determined distance from said GPS positioning means if a PDOP value is equal to or smaller than a predetermined value, if speed data from said GPS positioning means is equal to or greater than a predetermined value, and if the difference between said speed data from said GPS positioning means and the speed data from said stand alone type positioning means is equal to or smaller than a predetermined value.

4. A navigation system according to claim 3, wherein said data processing means comprises means for correcting said distance corrective coefficient based on the determined distance from said GPS positioning means additionally if the data from said GPS positioning means has been obtained consecutively three times at time intervals each equal to or smaller than a predetermined value, and if the consecutive three data from said GPS positioning means are equal to or smaller than a predetermined value.

5. A navigation system comprising:

GPS positioning means for determining a present position thereof from radio waves transmitted from GPS satellites, said GPS positioning means including means for producing speed data;

stand alone type positioning means including a speed sensor, for determining a present position thereof from speed data from said speed sensor using a distance corrective coefficient; and data processing means for correcting said distance corrective coefficient based o the speed data from said GPS positioning means if a PDOP value is equal to or smaller than a predetermined value, if speed data from said GPS positioning means is equal to or greater than a predetermined value, and if the difference between said speed data from said GPS positioning mean and the speed data from said stand alone type positioning means is equal to or smaller than a predetermined value.

6. A navigation system according to claim 5, wherein said data processing means comprises means for correcting said distance corrective coefficient based on the determined distance from said GPS positioning means additionally if the data from said GPS positioning means has been obtained consecutively three times at time intervals each equal to or smaller than a predetermined value, and if the consecutive three data from said GPS positioning means are equal to or smaller than a predetermined value.

* * * * *